Patented Mar. 9, 1948

2,437,289

UNITED STATES PATENT OFFICE 2,437,289

CYANOCYCLOBUTANE DERIVATIVES

Paul L. Barrick, Wilmington, Del., assignor to E. I. du Pont de Nemours & Company, Wilmington, Del., a corporation of Delaware No Drawing. Application January 28, 1944, Serial No. 520,104

9 Claims. (Cl. 260—464)

This invention relates to new compositions of matter and more particularly to the reaction of cyanofluorocyclobutanes with basic agents.

This invention has as an object the manufacture of new organic compounds. A further object is the production of new monomeric organic cyclic compounds comprising cyanocyclobutane derivatives. Further objects reside in methods of preparing these compounds; other objects will appear hereinafter.

These and other objects and advantages are accomplished by the herein described invention which broadly comprises admixing a cyanofluorocyclobutane and a basic agent.

By the term "basic agent" as employed herein and in the appended claims is meant a material having a basic dissociation constant greater than $9 \times 10^{-11}$ at 25° C.

The following examples, in which proportions are given in parts by weight unless otherwise specified, are given for illustrative purposes and are not intended to place any restrictions or limitations on the herein described invention:

Example I

To 30 parts of 1-cyano-2,2,3,3-tetrafluorocyclobutane in a glass reaction vessel was added slowly with agitation 60 parts of concentrated aqueous ammonia solution. The reaction mixture was kept at about 50° C. by cooling with cold water. When the temperature began to drop, indicating that the reaction was complete, the lower organic layer was separated and dissolved in ether. Upon evaporation to dryness of the aqueous solution, ammonium fluoride was obtained. After washing the ethereal solution with water and drying, the ether was removed by warming with steam. The cyanodifluorocyclobutyl imine obtained as the product was recrystallized from a benzene-petroleum ether mixture to yield a colorless solid melting at about 53–54° C.

*Analysis.*—Calculated for $C_5H_4F_2N_2$: F, 29.23%, N, 21.53%; found: F, 29.05%, N, 21.51%.

Example II

Using a procedure similar to that described above, in which a 35% aqueous solution of methylamine was used in place of the aqueous ammonium hydroxide solution, N-methyl cyanodifluorocyclobutyl imine was obtained upon recrystallization of the reaction product from a mixture of benzene and petroleum ether. Melting point, 66–67.5° C.

*Analysis.*—Calculated for $C_6H_6F_2N_2$: F, 26.4%, N, 19.44%; found: F, 24.25%, N, 19.43%.

Example III

To a sodium ethylate solution contained in a glass reaction vessel and prepared by dissolving 12 parts of metallic sodium in 200 parts of absolute ethyl alcohol was added 50 parts of 1-cyano-2,2,3,3-tetrafluorocyclobutane. The temperature of the reaction mixture was kept at about 15 to 20° C. by cooling the reaction vessel in an ice bath. The temperature began to drop when the last of the cyanotetrafluorocyclobutane was added, indicating completion of the reaction. The reaction mixture was then steam distilled and the water insoluble layer separated, dried and rectified. 1-cyano-2-ethoxy-3,3-difluorocyclobutene boiling at 83° C./31 mm. and 1-cyano-2,2-ethoxy-3,3-difluorocyclobutane boiling at 81.1° C./4 mm. were obtained.

*Analysis.*—Calculated for $C_7H_7F_2ON$: F, 23.9%, N, 8.8%; found for fraction boiling at 83° C./31 mm.: F, 23.83%, N, 9.34%. Calculated for $C_9H_{13}F_2O_2N$: F, 18.53%, N, 6.82%; found for fraction boiling at 81.1°/4 mm.: F, 18.10%, N, 7.70%.

The lower boiling fraction was readily oxidized by dilute aqueous potassium permanganate indicating the presence of an ethylenic double bond, whereas, with fraction 2, no reaction occurred.

Although the invention is illustrated by the reaction of 1-cyano-2,2,3,3-tetrafluorocyclobutane was basic agents, it is applicable to cyanofluorocyclobutanes in general. While appreciable effects are obtained when the cyanofluorocyclobutane contains but one fluorine atom in the four-carbon atom ring, it is to be understood that substantially increased effects are had when said ring is a polyfluorocyclobutane ring, i. e., contains at least 2 fluorine atoms. For optimum results said ring contains at least 4 halogen atoms, preferably at least 4 fluorine atoms, i. e., the compound reacted with the basic agent is a cyanotetrafluorocyclobutane. In addition to 1-cyano-2,2,3,3-tetrafluorocyclobutane, examples of cyanofluorocyclobutanes adapted for use in this invention include 1-cyano-2,2-difluorocyclobutane, 1-cyano-2,2,3-trifluorocyclobutane, 1-cyano-2,2,3-trifluoro-3-chlorocyclobutane, 1-cyano-2,3,3-trifluoro-2-chlorocyclobutane, 1-cyano-2,2-difluoro-3,3-dichlorocyclobutane, 1-cyano-2,2,3-trifluoro-3-bromo-cyclobutane and the like. A convenient method of preparing said cyanofluorocyclobutanes comprises heating a fluoroethylene containing a polymerization inhibitor with an acrylic acid nitrile at a temperature within the range of from 50° C. to 300° C. Specific methods of obtaining cyanofluorocyclobutanes are described in detail in my copending U. S. application, Serial No. 484,239, filed April 23, 1943.

Any material having a dissociation constant greater than $9 \times 10^{-11}$ at 25° C. is a basic agent and operable in my process. Included among said basic agents are: the nitrogen-containing bases, such as ammonia, the amines and quaternary ammonium hydroxides; inorganic hydroxides, such as alkali metal and alkaline earth metal hydroxides; tertiary sulfonium hydroxides; and salts having a basic dissociation constant greater than $9 \times 10^{-11}$ at 25° C. Specific examples of nitrogen-containing bases are: aqueous ammonium hydroxide; primary amines such as methylamine, ethylamine, butylamine, hexylamine, laurylamine, aniline, benzylamine, alphanaphthylamine and the like; secondary amines such as dimethylamine, diisobutylamine, diamylamine, piperidine, and the like; tertiary amines such as triethyl amine, triisobutylamine, trimethylamine, pyridine and the like; quaternary ammonium hydroxides such as tetramethyl ammonium hydroxide. Specific examples of inorganic hydroxides include sodium hydroxide, potassium hydroxide and calcium hydroxide; while sodium cyanide, sodium carbonate, sodium acetate and sodium ethylate are included among specific examples of salts adapted for use in this invention.

The process of this invention is generally conducted at temperatures within the range of from —35° C. to 100° C.; although lower temperatures can be used such as are obtainable by the use of carbon dioxide-acetone mixtures. In general, however, the reaction is carried out within the temperature range of from 0° C. to 75° C. since optimum results are obtained in this range.

The products of this invention are useful for various commercial purposes. They may be used as intermediates for the preparation of other fluorine containing compounds such as by hydrolysis or reduction of the nitrile group, as solvents and reaction media.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful:

1. The process for obtaining a compound containing a four-carbon atom ring to which is attached directly a cyano group and a tervalent nitrogen atom having at least one and not more than two valences attached directly to a carbon atom of said ring, which comprises admixing a cyanotetrafluorocyclobutane and a nitrogen-containing base which at 25° C. has a basic dissociation constant greater than $9 \times 10^{-11}$ selected from the class consisting of ammonia and the amines.

2. The process for obtaining a cyanodifluorocyclobutyl imine, which comprises contacting 1-cyano-2,2,3,3-tetrafluorocyclobutane with ammonia at a temperature within the range of from 0° C. to 75° C.

3. The process for obtaining a compound containing a four-carbon atom ring to which is attached directly a cyano group and a tervalent nitrogen atom having at least one and not more than two valences attached directly to a carbon atom of said ring, which comprises contacting 1-cyano-2,2,3,3-tetrafluorocyclobutane with an amine at a temperature within the range of from 0° C. to 75° C.

4. The process for obtaining an N-methyl-cyanodifluorocyclobutyl imine which comprises contacting 1-cyano-2,2,3,3-tetrafluorocyclobutane with methylamine at a temperature within the range of from 0° C. to 75° C.

5. A compound containing a four-carbon atom ring to which is attached directly a cyano group, a plurality of fluorine atoms, and a tervalent nitrogen atom having at least one and not more than two valences attached directly to a carbon atom of said ring.

6. A compound containing a four-carbon atom ring to which is attached directly a cyano group, two fluorine atoms, and a tervalent nitrogen atom having at least one and not more than two valences attached directly to a carbon atom of said ring.

7. A cyanodifluorocyclobutyl imine.

8. A cyclobutane to which is attached directly a cyano group, two fluorine atoms and an imino group having two valences attached directly to a carbon atom of said cyclobutane ring.

9. An N-methylcyanodifluorocyclobutyl imine.

PAUL L. BARRICK.

REFERENCES CITED

The following references are of record in the file of this patent:

UNITED STATES PATENTS

| Number | Name | Date |
|---|---|---|
| 1,882,335 | Mills | Oct. 11, 1932 |

OTHER REFERENCES

Campbell et al., J. Chem. Soc. (London), vol. 97, pages 2418–2425.

Meyer, "Synthesis of Carbon Compounds" (German language), part 1, vol. 2, 1934, pages 1409, 1410, 1414.

Perkin et al., Beilstein, "Handbuch der Org. Chemie" (4th ed., 1927), vol. 10, page 3.